US008628611B2

(12) United States Patent
Crespi et al.

(10) Patent No.: US 8,628,611 B2
(45) Date of Patent: Jan. 14, 2014

(54) RHEOLOGY MODIFIER FOR CERAMIC GLAZES

(75) Inventors: Stefano Crespi, Busto Arsizio (IT); Marco Antoniotti, Novara (IT); Giuseppe Li Bassi, Gavirate (IT); Giovanni Floridi, Novara (IT)

(73) Assignee: Lamberti SpA, Albizzate (VA) (IT)

( * ) Notice: Subject to any disclaimer, the term of this patent is extended or adjusted under 35 U.S.C. 154(b) by 0 days.

(21) Appl. No.: 13/582,918

(22) PCT Filed: Mar. 3, 2011

(86) PCT No.: PCT/EP2011/053223
§ 371 (c)(1),
(2), (4) Date: Sep. 5, 2012

(87) PCT Pub. No.: WO2011/107563
PCT Pub. Date: Sep. 9, 2011

(65) Prior Publication Data
US 2013/0150229 A1    Jun. 13, 2013

(30) Foreign Application Priority Data

Mar. 5, 2010   (IT) ............................... VA2010A0020

(51) Int. Cl.
  *C04B 41/50*   (2006.01)
  *C04B 41/86*   (2006.01)
(52) U.S. Cl.
  USPC ... 106/487; 106/197.01; 106/803; 427/376.2; 428/532; 428/688

(58) Field of Classification Search
  USPC ................. 106/197.01, 487, 803; 427/376.2; 428/532, 688
  See application file for complete search history.

(56) References Cited

U.S. PATENT DOCUMENTS

| | | | | | |
|---|---|---|---|---|---|
| 3,561,984 | A | * | 2/1971 | Eppler | 428/428 |
| 3,565,644 | A | * | 2/1971 | Eppler | 501/17 |
| 3,676,204 | A | * | 7/1972 | Eppler | 428/427 |
| 3,679,464 | A | * | 7/1972 | Eppler | 428/427 |
| 4,591,581 | A | * | 5/1986 | Crampton et al. | 502/407 |
| 4,634,538 | A | * | 1/1987 | Alexander | 507/110 |
| 5,061,397 | A | * | 10/1991 | Goodman | 510/334 |
| 5,266,538 | A | * | 11/1993 | Knudson et al. | 501/147 |
| 5,364,579 | A | * | 11/1994 | Dunaway et al. | 264/82 |
| 5,426,079 | A | * | 6/1995 | Hughes | 502/80 |
| 6,534,427 | B1 | * | 3/2003 | Quemere | 501/17 |
| 7,153,556 | B2 | * | 12/2006 | McKillip | 428/40.1 |
| 7,462,582 | B2 | * | 12/2008 | Komiyama et al. | 508/136 |
| 2009/0229775 | A1 | * | 9/2009 | Zhang et al. | 162/164.1 |

FOREIGN PATENT DOCUMENTS

EP    368507 A2    5/1990
WO    WO93/08230 A1 *    4/1993    ............... C08L 1/26

* cited by examiner

*Primary Examiner* — Anthony J Green
(74) *Attorney, Agent, or Firm* — Mossman, Kumar & Tyler, PC

(57) ABSTRACT

The present invention relates to a rheology modifier for ceramic glazes comprising a water-swellable granulated clay, a carboxymethyl cellulose and possibly another natural gum. In another aspect the invention relates to the ceramic glaze and the glaze slip obtained using the above rheology modifier, which can be used for glazing green or fired ceramic bodies such as artware, tableware, tile, heavy clays products and sanitaryware.

20 Claims, No Drawings

RHEOLOGY MODIFIER FOR CERAMIC GLAZES

FIELD OF THE INVENTION

The present invention relates to a rheology modifier for ceramic glazes comprising a water-swellable granulated clay, carboxymethyl cellulose and possibly another natural gum.

In another aspect the invention relates to the ceramic glaze and the glaze slip prepared using the above rheology modifier which can be employed for glazing both green and fired ceramic bodies such as artware, tableware, tiles and sanitaryware.

BACKGROUND OF THE ART

Most traditional ceramic manufactured products, such as tiles and sanitaryware, are made of a ceramic body that confers shape and mechanical properties to the object; the ceramic body generally has some porosity and poor aesthetic qualities.

Said ceramic body, which is defined "green" or, alternatively, "fired", is usually coated with a ceramic layer, called ceramic glaze; the ceramic glaze is sintered by firing, in such a way to gain suitable superficial aesthetic qualities and, in the meantime, to become a fluid-proof barrier; as a matter of fact, after firing, the ceramic glaze has usually zero porosity and is generally resistant to abrasion and to the attack of chemical agents such as acids, bases, dyes.

Glaze may be applied by dry dusting a dry mixture over the surface of the ceramic body or by applying on the surface of the ceramic body a glaze dispersed/suspended in a opportune vehicle. Traditional liquid ceramic glazes are suspensions of various powdered minerals and metal oxides that can be applied by directly dipping pieces into the glaze, pouring the glaze over the piece, spraying it onto the piece with an airbrush or similar tool, with a brush, or with any tool that will achieve the desired effect.

Liquid ceramic glazes, also called glaze slips, generally contain, dispersed in water, silica to form glass, also in form of frit (pre-fired vitreous component); in combination with a mixtures of metal oxides, usually in the form of pre-treated natural occurring minerals, such as sodium, potassium and calcium oxides which act as a flux and allow the glaze to melt at a particular temperature; alumina to stiffen the glaze and prevent it from running off the piece; ceramic pigments, such as: manganese dioxide 325 used to darken many different colors; copper carbonate used in reds, greens, and blues; cobalt oxide and cobalt carbonate used for vibrant blue pigments; and chrome oxide used for pinks, reds, and greens.

Because of the fact that most of the ingredients cited above are heavy ingredients and in order to obtain a proper coating before and after firing, it is necessary to add at least a rheology modifier into the liquid ceramic glazes that will help keeping the raw glaze batch in suspension and controlling its flow properties.

A rheology modifier is an additive which allows to opportunely regulate different parameters of the glaze such as: viscosity, pseudo-plasticity, thixotropy, binding and water retention properties, as it is well known to those skilled in the art. Typical rheological modifiers are suspending agents and thickening agents.

Suspending agents improve the stability and the flowability of the dispersion and also permit a higher percentage of suspended solids to be incorporated into the dispersion. Water-swellable clays are among the preferred suspending agents. Examples of these clays are bentonite, montmorillonite, kaolinite, hectorite, attapulgite, smectite and others. The most popular clay is standard Bentonite, which may contain small amount of iron. Another useful clay is Hectorite, which is very plastic and iron-free and belongs to the family of the smectite minerals. It is sold under various commercial names, including Bentone®, Hectabright®, Macaloid® and Vee-Gum®. Also synthetic smectites can be used for the same purpose.

Thickening agents, which have binding, film-forming, suspending and water retention properties, are naturally occurring or synthetically derivatized water-soluble polymer gums, such as xanthan gum, alginates, gum arabic and gum tragacanth. Modified cellulose ether gums, such as hydroxyethyl cellulose, methyl cellulose, methyl hydroxypropyl cellulose and sodium carboxymethyl cellulose, can be used. Also useful are synthetic polymers such as Carbopol® (a high molecular weight acrylic acid based polymer) and polyvinyl pyrrolidone and its copolymers. Synthetic polymers, because of their greater tendency to cause undesirable gelling of the dispersion, are less preferred than natural gums.

Even if thickening agents can be used alone in the glazes, they are usually used in combination with the suspending agents because they act synergistically to improve the rheological characteristics of the glazes.

Unfortunately, rheology modifiers, and especially water-swellable clays, are often difficult to dissolve in the thick glaze slip and, if not stirred for enough time and/or with a high shear mixer, they can create lumps or aggregates in the glaze slip. This problem can be solved by:
 pre-dissolving the rheology modifier in water and leaving this solution to mature for hours (up to 24 hours),
 applying a long mixing time to the glaze slip,
 using very efficient mixers.

All these solutions reduce the productivity and increase the cost and complexity of the process.

After preparation, the glaze slip is sieved in order to eliminate residual impurities and aggregates. If not completely dissolved, the lumps or aggregates of the rheology modifier can increase considerably the time required for the sieving.

Moreover, a partial dissolution of the rheology modifier can require a time-consuming correction of the viscosity of the glaze slip or, if not corrected, can cause serious glazing defects on the final products, such as leveling problems, running or crawling, which are well known to those expert in the art.

We have surprisingly found that at least one water-swellable granulated clay, at least one carboxymethyl cellulose (CMC) and, optionally, another natural gum can be suitably formulated in order to get a fast dissolving rheology modifier which can be optionally added in powder form to the glaze slip, avoiding the time consuming pre-dissolution step and at the same time reducing significantly the formation of lumps. Moreover this rheology modifier imparts very good rheological behavior to the glaze, avoiding dropping or staining problems, and has a great binding action that avoids crawling and release of the dry glaze before firing.

With the expression "water-swellable granulated clays" we mean clays in powder form which are capable of adsorbing water and have been subjected to a granulation process.

With natural gum we intend naturally occurring water-soluble polymer gum, usually polysaccharides extracted from vegetables or algae or biopolymers. Also the chemically or physically modified natural gums are included in this definition.

In the present text, by "ceramic glaze" we mean the raw material mixture that is used to produce the sintered ceramic layer used to coat ceramic bodies.

In the ceramic field, EP0368507 describes a colored ceramic glaze containing a non-granulated water-swellable smectite clay as suspending agent and a natural gum, for example carboxymethyl cellulose, as thickening agent.

As far as the Applicant knows, a mixture of a water-swellable granulated clay and carboxymethyl cellulose has not been described in the literature as rheology modifier for ceramic glaze.

DESCRIPTION OF THE INVENTION

It is therefore a fundamental object of the present invention a rheology modifier for ceramic glazes comprising:
a) from 15 to 80% by weight (wt) of at least one water-swellable granulated clay with more than 90% wt of the particles with size comprised between 0.15 and 3 mm;
b) from 10 to 85% wt of at least one carboxymethyl cellulose (CMC);
c) from 0 to 50% wt of another natural gum; provided that the sum of a) and b) represents at least 40% by weight of the rheology modifier and the sum of a), b) and c) represents at least 85% wt of the rheology modifier.

Ceramic glaze comprising between 0.05 and 3% wt of the above rheology modifier based on granulated water-swellable clay and CMC and the glaze slip comprising said ceramic glaze and from 15 to 60% wt of a liquid vehicle, the use of the above ceramic glaze for art ware, tableware, tiles, technical ceramics and sanitary ware, glazed bricks and roof tiles, and the ceramic bodies obtained by using the ceramic glaze are further objects of the invention.

DETAILED DESCRIPTION OF THE INVENTION

Preferably the rheology modifier of the invention comprises:
a) from 30 to 70% wt of at least one water-swellable granulated clay with more than 90% wt of the particles with size comprised between 0.15 and 3 mm;
b) from 30 to 70% wt of at least one carboxymethyl cellulose;
c) from 0 to 20% wt of at least another natural gum;

The water-swellable granulated clays a) can be obtained by granulation methods and equipments commonly in use in this field and known to those expert in the art; in particular, a water-swellable clay in the form of powder can be granulated by means of a fluidized bed, a rolling, or a spray drying apparatus. Preferably, the granulation of the water-swellable clay in the form of powder according to the invention is performed by means of a rolling granulating apparatus.

The water-swellable clay utilizable for the preparation of the water-swellable granulated clay can be chosen among the water swellable clays commonly used in the ceramic field and known to those expert in the art. As an example, the water-swellable clay can be bentonite, montmorillonite, kaolinite, hectorite, attapulgite and smectite or a mixture thereof.

The preferred particle size of the starting water-swellable clay used for the preparation of the granular particles is in the range between 0.05 and 150 microns; more preferably 90% wt of the starting clay is below 75 microns and max 10% wt is below 10 microns.

All the mentioned granulation methods require as a process aid the presence of a temporary organic or inorganic binder. Examples of temporary organic binders are natural gums, cellulose ethers, starch and dextrin glues, polymerized alcohols, polyacrylates, polyvinyl alcohol, polyvinyl acetate, polyethylene glycol and waxes. Other organic binders can be used without changing the scope of the invention. Preferred organic binders are cellulose ethers. Usually from 0.1 to 7% by weight of organic binder is used on weight the granulated product. Examples of temporary inorganic binders are sodium silicates (water glass).

The temporary binder is added in liquid form, either because the binder is a liquid, or because the binder is dissolved in a opportune solvent, such as water. The liquid organic binder is combined with the clay preferably by spraying the liquid on the powders, but other common methods of combining the raw batch materials can also be used. Excess liquid can be removed by drying in a drier, such as a fluid bed drier, or by spray drying. At the end of the process the granulated clays contain from about 0.1 to about 7.0% wt of binder.

Granulation is normally carried out to give almost spherical particles of a diameter in the range between about 0.15 and about 3 mm, preferably from about 0.2 mm to about 1 mm.

Granular particles that are larger than the desired size can be separated by sieving, broken down into smaller particles and brought back through the granulation process.

The carboxymethyl cellulose b) suitable for the realization of the present invention can be chosen among those commonly used in the ceramic field and known to those expert in the art. The carboxymethyl cellulose preferred for the realization of the present invention has degree of substitution comprised between 0.5 and 1.5, more preferably between 0.6 and 1.2. Preferably its Brookfield LVT® viscosity, at 2% wt in water, 60 rpm and 20° C., is from 50 to 30,000 mPa·s, more preferably from 1,000 to 15,000 mPa·s.

The carboxymethyl cellulose useful for the realization of the present invention can be technical or purified carboxymethyl cellulose. Advantageously, the carboxymethyl cellulose is a purified grade CMC having a percentage of active substance above 95% by weight on dry matter, and a content of water of about 2-10 wt %.

In a preferred embodiment the carboxymethyl cellulose has more than 90% wt of the particles with a size comprised between 0.05 mm and 2.0 mm or has been subjected to a granulation process.

In another preferred embodiment the carboxymethyl cellulose is a high dispersible CMC. This CMC is treated with a reversible crosslinking agent, such as glyoxal, in order to reduce the hydration velocity and, at the same time, to increase its dispersibility.

A variety of natural gums may be incorporated as component c) into the rheology modifier of the invention. Suitable natural gums include, but are not limited to: cellulose derivatives different from CMC, starch and starch derivatives, guar gum and guar gum derivatives, xanthan gum, arabic gum, tragacanth gum or mixture thereof.

The disclosed rheology modifier can comprise up to 15% by wt of one or more additives selected from preservatives, biocides, sequestering agents, antifoams, dispersants, binders, deflocculant, coagulants and leveling agents.

In a preferred embodiment the ceramic glaze contains from 0.2 to 1% by weight of the rheology modifier of the invention.

All glazes normally used in the ceramic industries and well known to those expert in the art can be prepared using the rheology modifier of the invention. Various examples of ceramic glaze formulations can be found in literature, such as in: Fortuna D., "Sanitaryware", Gruppo Editoriale Faenza Editrice, p. 61-64 (2000) and Stefanov S. and Batscharow S., "Ceramic Glazes", Bauverlag GmbH (1989).

As already said, typical components of ceramic glazes are silica, fluxes, alumina and ceramic pigments.

Silica and alumina can be added to glazes by the addition of minerals, such as: quartz, flint, ball clay, kaolin, feldspars or mixtures thereof. Silica can be also added to the glaze in the form of frits, the term frit referring to that granulated or particulate material obtained when molten glass is poured into cold water. Frits are normally mixtures of various mineral materials containing among the others silica, alumina, metal oxides, boron oxide.

Fluxes lower the melting point of the glass formers. Non exhaustive examples of fluxes are alkali and alkali-earth oxides and carbonates.

The ceramic pigments useful in the ceramic glaze of the invention are solid sinterable materials. Examples of ceramic pigments include iron, titanium, copper, chromium, zinc, magnesium, aluminum, cobalt, and cadmium oxides or salts, and zirconium and praseodymium silicates.

The rheology modifier of the invention can be added to the glaze in the mill during the grinding or during the preparation of the glaze slip, both as such, i.e. a mixture of granular material, or as a water dispersion at a concentration ranging from 1 to 30% wt; preferably they are added to the glaze in dry form.

The glaze of the invention can further contain other additives commonly used in the ceramic industry such as preservatives, biocides, antifoams, dispersants, binders, deflocculants, levelling agents, plasticizers, coagulants.

For liquid applications, glazes are normally ground and sieved, then are suspended in a vehicle such as water obtaining the so called glaze slip. The ratio between the glaze and the vehicle is between 85/15 and 40/60 wt. Often grinding of the glazes is performed directly in the presence of the vehicle to provide the glaze slip in a single operation.

The glaze slip of the present invention is a fluid with a viscosity, measured by means of a Gallenkanp® viscometer at 20° C., cylinder Ø1 1/16", torsion wire 30 SWG, time zero, comprised between 100 and 360°. The final viscosity of the glaze slip is chosen depending on the manner in which the glaze is to be applied to the substrate.

The glaze slip of the present invention may be applied on green or fired ceramic bodies such as artware, tableware, tiles, roofing tiles, bricks, heavy clay products and sanitaryware using anyone of the conventional application techniques known to those expert in the art. Application techniques such as disk and bell applications, dipping, spraying, screen printing, brushing and electrostatic applications can be employed.

The disclosed glaze slip is storage stable for several days without change of its rheological profile and can be used as if it was freshly prepared.

EXAMPLES

In the following examples the viscosity was measured by means of a Gallenkanp® viscometer at 20° C., cylinder Ø11/16", torsion wire 30 SWG, time zero and the density was determined with a pyknometer.

Preparation of Granulated Smectite.

100 g of a 4% wt of a Sodium Carboxymethyl Cellulose (Active content>98%; DS=0.8; Brookfield® LVT Viscosity 4% wt in water, at 60 rpm, 25° C., 55 mPa·sec) water solution was prepared in a 250 ml glass beaker.

40 g of a smectite in powder form (90% wt<80 microns) were added to the above described solution.

The mixture was stirred by means of high speed mechanical stirrer working at 1000 rpm and equipped with a eight blades impeller for 10 minutes.

The so obtained paste was transferred in an oven at 60° C. for 28 hours. A material with a residual moisture of about 8% wt was obtained.

This dry smectite aggregate was grinded by means of a kitchen jar blender and sieved on ASTM stainless steel sieves in order to select only grains with a particle dimension comprised in the range between 250 and 1,000 microns.

Formulation of Rheology Modifiers.

Two rheology modifiers, Mix 1 (Comparative) and Mix 2 (according to the invention), were prepared with the compositions shown in Table 1. All the components were mixed and homogenized in a 250 g plastic bag.

TABLE 1

| Component | Mix 1 (comparative) | Mix 2 |
|---|---|---|
| Smectite regular (90% wt < 80 microns) | 33 | |
| Smectite granulated (99% wt 250-1000 microns) | | 33 |
| Sodium Carboxymethyl Cellulose * | 62 | 62 |
| Biocide | 2 | 2 |
| Ethylenediaminetetraacetic Acid | 3 | 3 |

* Active content > 95%; DS = 0.82; Brookfield ® Viscosity LVT 60 rpm, 20° C., 2% sol. in water, 4100 mPa*sec;

Dissolution Behavior Test in Water.

The dissolution capability in water of the two rheology modifiers, Mix 1 (Comparative) and Mix 2 (according to the invention), was evaluated in the following way:

4 g of each Mix was dissolved in 200 g of water in a 250 ml glass beaker by means of high speed mechanical stirrer equipped with a eight blades impeller, working at 320 rpm for 10 minutes and after that at 1000 rpm for 20 minutes.

The solutions were screened on a tared 150 microns ASTM sieve (100 mesh) and the amount of undissolved material was determined by weight difference after drying in oven at 105° C. for 2 hours. The following results were obtained:

| | Sol 1 (Comparative) | Sol 2 |
|---|---|---|
| Dry Residue | 0.45% wt | 0.15% wt |

Dissolution Behavior Test in a Glaze Slip.

The dissolution capability in a glaze slip of the two rheology modifiers, Mix1 (Comparative) and Mix2 (according to the invention), was evaluated in the following way:

A blank (without rheology modifier) liquid glaze for sanitaryware is prepared transferring in a 3000 ml jar:

1600 g of a standard dry sanitaryware white glaze in powder form 720 g of water 1.28 g Reotan L commercialized by Lamberti S.p.A. (dispersant)

2080 g alumina grinding media

The blank liquid glaze was ground in a jar-mill for 15 minute and then poured in a 2000 ml glass beaker separing the grinding media with a 3 mm sieve.

The main parameters of the so obtained glaze slip were (at 20° C.):

Density: 1760 g/l

Gallenkanp Viscosity: 340°

1) Evaluation of residue after a standard dissolution time.

Two portions of 270 g each of the glaze slip were poured in two 250 ml glass beakers.

0.55 g (0.3% as dry weight) of rheology modifier Mix 1 (Comparative) were added to one of them (Slip 1), 0.55 g (0.3% as dry weight) of the other rheology modifier Mix 2 were added to the second slip (Slip 2). Both mixture were stirred by means of high speed mechanical stirrer equipped with a eight blades impeller, working at 650 rpm for 2 minutes and after that at 1000 rpm for 8 minutes.

The main parameters of the so obtained glaze slips were (at 20° C.):

Slip 1 (Comparative)
Density: 1755 g/l
Gallenkanp Viscosity: 310°
Slip 2
Density: 1754 g/l
Gallenkanp Viscosity: 272°

Then the glazes were screened with a tared 150 microns ASTM sieve (100 mesh) and the amount of undissolved material, which of course inglobe also a small amounts of the minerals componing the glaze, was determined by weight difference after drying in oven at 105° C. for 2 hours. The following results were obtained:

|  | Slip 1 (Comparative) | Slip 2 |
|---|---|---|
| Dry Residue | 0.70% wt | 0.20% wt |

2) Evaluation of the processing times.

Several portions of 270 g each of the glaze slip were poured in 250 ml glass beakers.

In one series of samples (Slip 1) 0.55 g each (0.3% on dry weight) of the rheology modifier Mix 1 (Comparative) were added, in a second series of samples (Slip 2) 0.55 g each (0.3% on dry weight) of the rheology modifier Mix 2. All the samples were stirred by means of high speed mechanical stirrer equipped with a eight blades impeller for 2 minutes at 650 rpm and then at 1000 rpm for the remaining minutes.

Each samples were screened after stirring with a tared 150 microns ASTM sieve (100 mesh) and the amount of undissolved material, which of course also incorporates a small amount of the minerals composing the glaze, was determined by weight difference after drying in oven at 105° C. for 2 hours. The test was interrupted when the residue amount was below 0.001% wt. The time needed to reach this value, with laboratory equipment, gives a rough, underestimated evaluation of the industrial processing times.

The following results (Table 2) were obtained:

TABLE 2

|  | Slip 1 (Comparative) | Slip 2 |
|---|---|---|
| Dry Residue - 10 minutes | 0.70% wt | 0.20% wt |
| Dry Residue - 15 minutes | 0.19% wt | <0.001% wt |
| Dry Residue - 30 minutes | 0.003% wt |  |
| Dry Residue - 45 minutes | <0.001% wt |  |

The results of the dissolution behavior tests show that the rheology modifier of the invention has a better dissolution behavior compared with a rheology modifier of the known art. Because of this characteristic the use of the rheology modifier of the invention allows shorter industrial processing time and simpler procedures for the preparation of the glaze slip, together with simpler and more precise dosage of the rheology modifier and very good rheological behavior of the glaze, which prevents dropping or staining problems, and great binding action that avoids crawling and release of dust.

The invention claimed is:

1. A rheology modifier for ceramic glazes comprising:
   a) from about 15 to about 80% by weight (wt) of a water-swellable granulated clay with more than 90% wt of the water-swellable granulated clay having particles having a diameter of from about 0.15 to about 3 mm;
   b) from 10 to 85% wt of first gum wherein the first gum is carboxymethyl cellulose;
   c) from 0 to 50% wt of a second gum which is not carboxymethyl cellulose;
   wherein the sum of a) and b) represents at least 40% wt of the rheology modifier and the sum of a), b) and c) represents at least 85% wt of the rheology modifier.

2. The rheology modifier of claim 1 wherein the water-swellable granulated clay with more than 90% wt of the water-swellable granulated clay having particles having a diameter of from about 0.15 to about 3 mm is present at a concentration of from about 30 to about 70% wt.

3. The rheology modifier of claim 1 wherein the first gum is present at a concentration of from about 30 to about 70% wt.

4. The rheology modifier of claim 1 wherein the second gum is present at a concentration of from about 0 to about 20% wt.

5. The rheology modifier of claim 1 wherein the water swellable granulated clay is prepared using water-swellable clay selected from the group consisting of bentonite, montmorillonite, kaolinite, hectorite, attapulgite, smectite, and mixtures thereof; and
   the water swellable clay has more than 90% wt of particles having a size ranging from about 0.2 to about 1 mm.

6. The rheology modifier according to claim 1 wherein the first gum has a degree of substitution ranging from about 0.5 to about 1.5 and a Brookfield LVT® viscosity, at 2% wt in water, 60 rpm and 20° C., ranging from about 50 to about 30,000 mPa*s.

7. The rheology modifier of claim 6 wherein the first gum has a degree of substitution ranging from about 0.6 to about 1.2 and a Brookfield LVT® viscosity, at 2% wt in water, 60 rpm and 20° C., ranging from about 1000 to about 15,000 mPa*s.

8. The rheology modifier of claim 7 wherein the first gum has more than 90% wt of particles with a size ranging between from 0.05 to about 2 mm.

9. The rheology modifier of claim 7 wherein the first gum has been granulated.

10. The rheology modifier of claim 1 wherein the second gum is a natural gum.

11. The rheology modifier of claim 1 wherein the second gum is chosen from the group consisiting of cellulose derivatives different from carboxymethyl cellulose, starch and starch derivatives, guar gum and guar gum derivatives, xanthan gum, arabic gum, tragacanth gum and mixtures thereof.

12. The rheology modifier of claim 1 additionally comprising up to 15% by weight of one or more additives selected from the group consisting of preservatives, biocides, sequestering agents, antifoams, dispersants, binders, deflocculants, coagulants and leveling agents.

13. A ceramic glaze comprising from about 0.05% to about 3% wt of the rheology modifier of claim 1.

14. The ceramic glaze of claim 13 further comprising from about 0.2 to about 1% by weight of the rheology modifier of claim 1.

15. The ceramic glaze of claim 13 further comprising from about 15 to about 60% wt of a liquid vehicle.

16. A method for glazing ceramics bodies comprising glazing the ceramic bodies using ceramic glaze of claim 13 for glazing ceramic bodies.

17. The method of claim 16 wherein the ceramic glaze additionally comprises from about 15 to about 60% wt of a liquid vehicle.

18. The method of claim 16 wherein the ceramic bodies are selected from the group consisting of artware, tableware, tiles, technical ceramics, sanitary ware, glazed bricks and roof tiles.

19. A glazed ceramic body prepared utilizing the method of claim 16.

20. The glazed ceramic body of claim 19 wherein the ceramic body is selected from the group consisting of artware, tableware, tiles, technical ceramics, sanitary ware, glazed bricks and roof tiles.

* * * * *